July. 1, 1924.
R. R. BROWN
DUMPING WAGON
Filed July 31, 1923
1,499,969
2 Sheets-Sheet 1
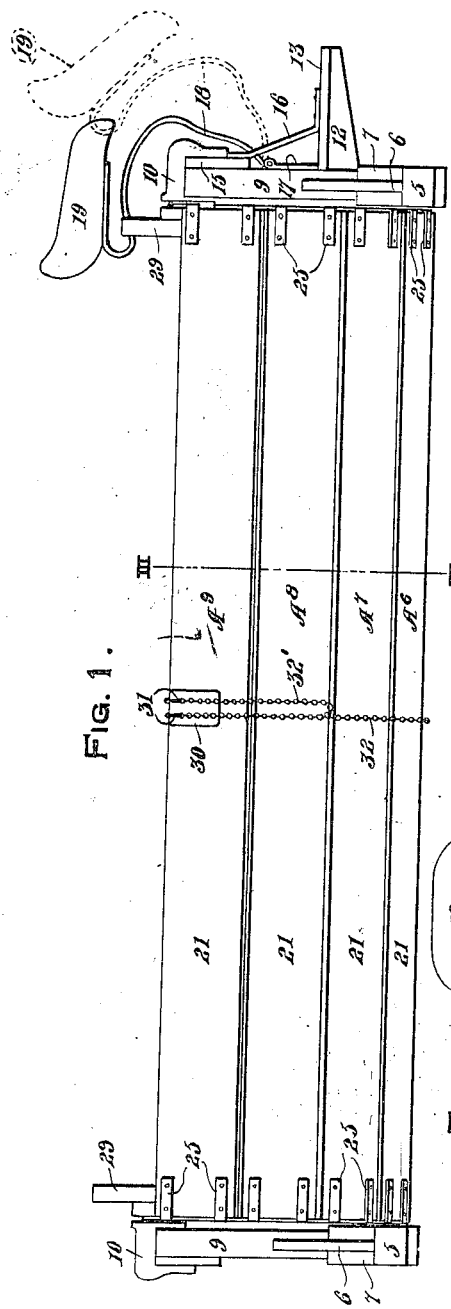
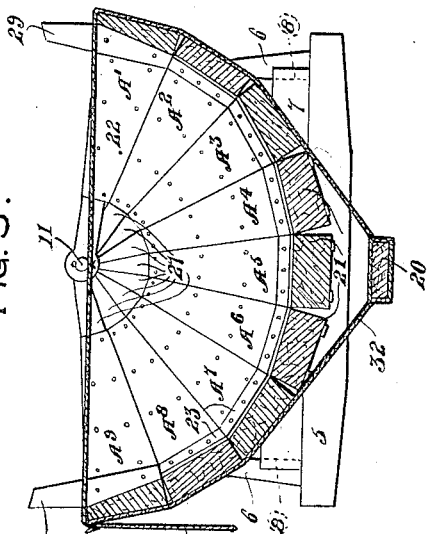
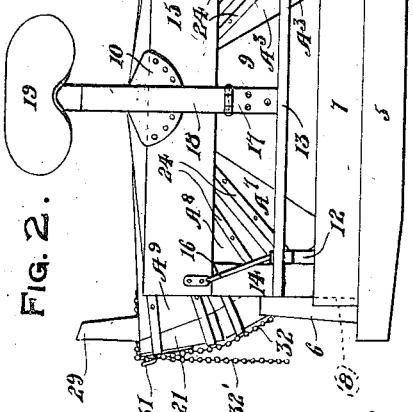
Inventor
R. R. Brown
By F. R. Bryant
Attorney.

July 1, 1924.
R. R. BROWN
DUMPING WAGON
Filed July 31, 1923
1,499,969
2 Sheets-Sheet 2
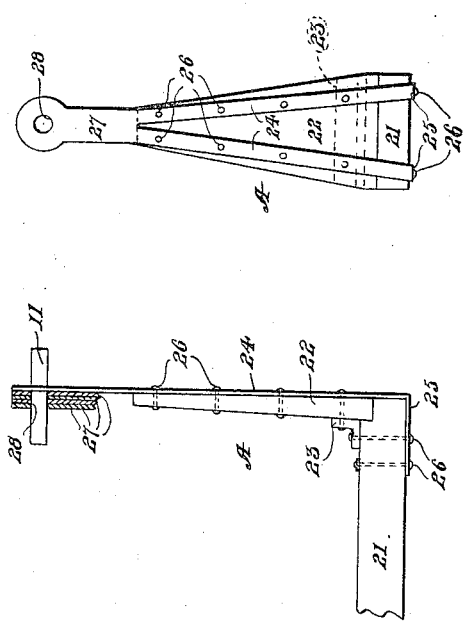
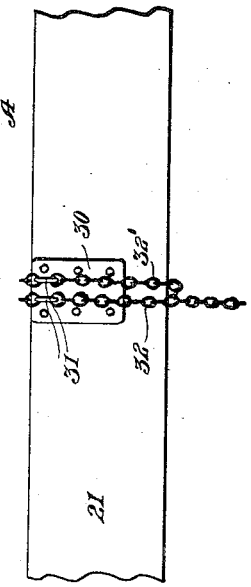
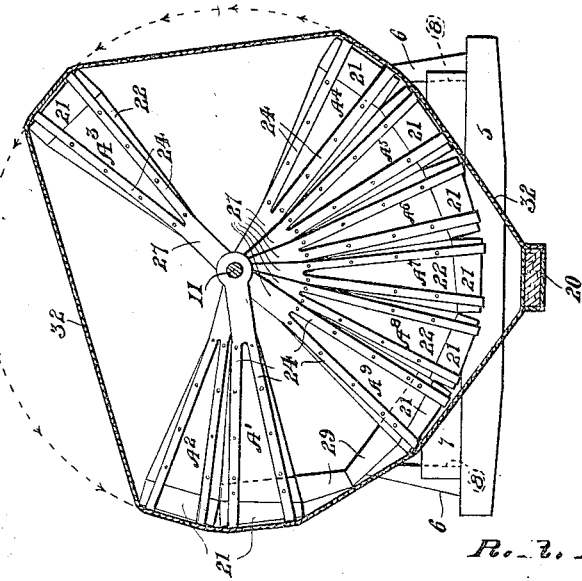
Inventor
R. R. Brown
By F. R. Bryant
Attorney Patented July 1, 1924.

1,499,969

UNITED STATES PATENT OFFICE.

ROY R. BROWN, OF GLENS FALLS, NEW YORK.

DUMPING WAGON.

Application filed July 31, 1923. Serial No. 654,956.

*To all whom it may concern:*

Be it known that I, ROY R. BROWN, a citizen of the United States of America, residing at Glens Falls, in the county of Warren and State of New York, have invented certain new and useful Improvements in Dumping Wagons, of which the following is a specification.

This invention relates to new and useful improvements in dumping wagons adapted for handling heavy loads, such as stone, gravel, sand, snow, etc.

An important object of the invention is to provide a load dumping body that may be quickly and easily applied to any ordinary type of wagon gear or sleigh without necessitating the making of material alterations to the construction of the same.

A further object of the invention is to provide a body of the above mentioned type which is formed from a plurality of units which are sufficiently light in weight to permit one man to place them, one unit at a time, in their proper places upon a wagon gear for assembling the complete body.

A further object of the invention is to provide a load dumping body for a wagon or sleigh running gear of a construction that will permit turning of the same around short corners or in relatively small spaces.

A further object of the invention is the provision of a body from which fragmentary portions of a load may be dumped at different, desired places without disturbing the remainder of the load and without employing separate unloading means, such as shovels or the like.

A further object of the invention is the provision of a body of the above mentioned type from which a fragmentary portion of the load may be dumped from either side of the wagon without disturbing the remainder of the load.

A further object of the invention is to provide a wagon construction which will equally distribute the weight of the load upon the front and rear wheels of the same.

A still further object of the invention is to provide a wagon or sleigh with a load dumping body which is adapted for handling heavy material, such as stone, and which may be arranged to permit the loading of such heavy articles into the body without necessitating the lifting of the same over the high sides which are usually found on dumping wagons.

Other objects and advantages of the invention will be apparent during the course of the following description.

In the accompanying drawings forming a part of this specification and in which like numerals are employed to designate like parts throughout the same, Figure 1 is a side elevational view of the load dumping body forming this invention and shown associated with a portion of an ordinary type of wagon gear, Figure 2 is a front elevational view of the body and gear shown in Fig. 1, Figure 3 is a transverse sectional view taken upon line III—III of Fig. 1, Figure 4 is an end elevational view taken from the rear of the body with the rear supporting post removed and shows a portion of the body segments shifted to allow for dumping a portion of the load and further shows a body segment during the operation of shifting the same, Figure 5 is a detail side elevational view of a fragmentary portion of one of the body segments and shows the manner of supporting the same, Figure 6 is a detail end elevational view of one of the body segments, and Figure 7 is a fragmentary side elevational view of the central portion of one of the body segments and shows a securing means for the binding chain or cable employed for retaining the complete body in a stationary position in respect to the wagon or sleigh upon which it is mounted.

In the drawings, wherein for the purpose of illustration is shown a preferred embodiment of this invention, the numeral 5 designates the bolsters of any ordinary form of wagon or sleigh gear having the upright stakes 6 carried thereby.

The means employed for mounting the load housing portion of the body consists of front and rear end portions each comprising a transversely extending beam 7 having grooves 8 formed in its opposite ends adapted for slidably engaging the stakes 6 carried by one bolster 5. Each of these beams 7 are provided with a strongly constructed end post 9 which is secured to the said beam 7 in any desired manner. These end posts 9 are each provided with a casting 10 that is adapted for having a stub shaft 11 secured thereto.

By referring to Figs. 1 and 2, it will be seen that the front end of the wagon body is provided with a pair of spaced supporting brackets 12 that are suitably secured to the transversely extending beam 7 and are adapted for supporting the foot rest 13. Extending upwardly from this beam 7 and positioned at opposite ends of the same are a pair of braces 14 that carry the transversely extending board 15. There are further provided brace rods 16 that are secured at their upper ends to the board 15 and are adapted for further supporting the foot rest 13. A metallic bracket plate 17 is suitably secured to the front end post 9 and is hingedly connected to a semi-resilient steel strap 18 that is properly bent to support the seat 19 in the manner shown in these two figures. In Fig. 1 there is shown in dotted lines the seat and resilient strap 19 and 18 respectively moved forwardly for better enabling the operation of the body segments.

In Figs. 3 and 4 there is shown a wagon reach 20 that is to be employed for a purpose described at a later point.

The load housing portion of the body is formed by a plurality of segments A, there being provided nine of the same in this particular showing, therefore, I will refer to the same by the characters $A^1$ to $A^9$ inclusive in Figs. 1 to 4. These body segments each consist of a plank 21 that extends longitudinally of the wagon substantially the full distance between the end posts 9, there being provided clearance space only between the ends of these planks and the posts 9. Connected to the ends of the planks 21 are end boards 22 that extend at right angles to the said planks and are secured in these portions by means of the angle plates 23 and the diverging straps 24 that are each provided with an angular end portion 25 that extends below the plank 21. It will be seen in Figs. 5 and 6 that suitable screws or rivets 26 are provided for connecting the diverging straps 24, their angularly arranged end portions 25 and the angle strips 23 to the planks 21 and the end boards 22. The diverging straps 24 are formed integrally at their upper end with the head portion 27 that is provided with an aperture 28 adapted for being positioned upon the stub shaft 11 in such a manner to allow the said body segments to pivot or swing thereupon. It will be seen by this construction that the planks 21 and end boards 22 are pivotally or swingingly supported by the stub shafts 11 and are so arranged to form the semi-cylindrical body shown in Figs. 1 to 3 inclusive. The body segments $A^1$ and $A^9$ are provided at their opposite ends with laterally extending bumpers or spacer blocks 29 which are intended to perform specific functions which will be described in detail at a later point. The blank portions 21 of these same two body segments are provided on their outer faces with plates 30 having spaced hooks 31 secued thereto for a purpose to be described more in detail as the operation of the body is explained.

By inspecting Figs. 3 and 4, it will be seen that the body segment $A^5$ is the middle or bottom segment when the total number of segments are arranged in respect to each other to form the semi-cylindrical body. The plank 21 that forms a part of the segment $A^5$ is of considerable thickness and is so constructed to adapt the same to support the greatest amount of weight. The segments radiating laterally in both directions from this segment $A^5$ are provided with planks 21 that gradually decrease in thickness as they are positioned a greater distance from the bottom or middle segment. The planks 21 are reduced in thickness in these various segments on account of the fact that they are not required to carry as much of the load and that the load decreases in proportion to the amount each segment has to carry. The reducing of the thickness of the planks 21 also allows the uppermost segments to be moved more easily, due to the fact that they are of lighter construction.

When the various body segments are positioned as shown in Figs. 1 to 3 inclusive the semi-cylindrical body is formed and is ready for being loaded. For the purpose of preventing separation of the segments and for preventing the same from rocking upon the stub shafts 11 during the travel of the wagon or sleigh from place to place, a binding cable or chain 32 is provided and is formed in one piece with the ends of the same secured to the wagon reach 20. This single piece of cable or chain is formed of a sufficient length to allow for the swinging of the segments through the arrow line 33, shown in Fig. 4, for transferring any desired number of the segments from one side of the wagon to the other. When it is desired to retain the segments in the position shown in Figs. 1 to 3 the cable or chain 32 is drawn tight upon one side and hooked to one of the elements 31 carried by the plate 30 in the uppermost segment on that particular side. The cable is then drawn taut or tight upon the other side and similarly secured to the uppermost segment. The remaining slack portion of the cable or chain is then drawn tightly across the top of the body and allowed to loop downwardly, as designated by the numeral 32' upon one side of the body.

The manner of assembling the various units employed to form the complete device is as follows:—

It is to be understood that the bolsters 5 and upwardly extending stakes 6 form a part of an ordinary wagon or sleigh gear. The end post 9, transversely extending beam 7, and bearing casting 10 positioned at the rear end of the body are handled as one complete unit and are positioned upon the rear bolster and stakes by allowing the said beam 7 to be positioned with the grooves 8 in alinement with the stakes 6 and then forcing downwardly until the beam 7 rests flushly against the bolster 5. At the front end of the body, the beam 7, post 9, bearing casting 10, and foot rest and seat elements are handled as a single unit and are positioned upon the bolster 5 and stakes 6 in a manner similar to that described in connection with the rear unit. It is to be understood that the stub shaft 11 carried by one of the bearing castings 10 will be allowed to slide longitudinally of the casting opening while the remaining stub shaft is prevented from moving in a longitudinal direction. The body segments are next properly positioned to be supported by the stub shafts 11. The body segment A⁵ is first put in position by causing the stub shaft 11 that is retained against longitudinal movement to be inserted through the opening 28 carried by one of the head portions 27. The slidably supported stub shaft at the opposite end of the wagon is then inserted through the aperture 28 carried by the head 27 positioned at that end of the segment. The segments A⁴ and A⁶ are then mounted upon the stub shaft 11 in a similar manner to the mounting of the segment A⁵. The segments A³ and A⁷ are next mounted in their respective positions and then the segments A², A⁸, A¹, and A⁹ are positioned upon the stub shafts 11 in the order named and in the manner best illustrated in Fig. 3. It will now be seen that the semi-cylindrical body has been formed.

The operation of the body segments for dumping the load is as follows:—

It is to be understood that after the wagon body has been unloaded, the binding cable or chain 32 is immediately tightened about the body segments in the manner previously described. When the wagon has been loaded and moved to any desired point at which a fragmentary portion of the load is to be dumped, the cable or chain 32 is loosened from the hook elements 31 and any desired number of the segments may be shifted from one side of the wagon to the other, for dumping the load in the manner best illustrated in Fig. 4. It will be seen that the bumpers or spacing blocks 29 carried by the segments A¹ and A⁹ will be positioned with their ends abutting each other when either one is shifted in the direction of the other. This will always prevent the segments just mentioned from being positioned with their side edges flushly engaging each other and will also prevent the said segments from falling as heavily as they would if the blocks 29 were not there. The segments may be moved as the operator desires to unload fragmentary portions of the material housed within the body and by moving a sufficient number of the segments, the entire load may be dumped. The portion of the load carried by each segment will fall in the space between the reach 20 and the wagon wheels, not shown and will, therefore, not lodge on any part of the wagon gear. It is to be understood that the seat 19 is to be shifted into its dotted line position as shown in Fig. 1 when the segments are moved through the arcuate arrow line 33 shown in Fig. 4.

As has been previously described, the body of the wagon is of semi-cylindrical shape when the various segments are in their proper positions for carrying a complete load. This formation will allow the front wheels to move a considerable distance under the body for permitting the wagon to be turned around sharp corners or in relatively small spaces.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:—

1. The combination with a vehicle running gear of end posts carried by said gear, longitudinally extending shafts carried by said posts, and a semi-cylindrically-shaped body carried by said shafts, said body consisting of a multiplicity of segments adapted to be consecutively swung from one side of the body to the other for causing the center of gravity to be shifted laterally to cause a load to be dumped a fragmentary part at a time.

2. The combination with a vehicle running gear, of end posts carried by said gear, longitudinally extending shafts carried by said posts, and a semi-cylindrically-shaped body carried by said shafts, said body consisting of a multiplicity of longitudinally extending segments pivotally mounted upon said shafts adapted to be shifted from one side of the body to the other for causing the center of gravity to be moved laterally to allow proportionate parts of the load to be dumped, and means for retaining the segmental body in a stationary position in respect to said running gear when so desired.

3. The combination with a vehicle running gear, of a semi-cylindrically-shaped dumping body, means carried by said gear for swingingly supporting said body, said body consisting of a multiplicity of independently movable segments adapted to be shifted from one side of the body to the other for dumping predetermined fragmentary portions of the load at will, and a cable attached to said running gear extending entirely around said body and adapted to be attached thereto for preventing accidental separation of the body segments and for retaining the body stationary in respect to the running gear.

4. The combination with a vehicle running gear, of a semi-cylindrically-shaped dumping body, means carried by said gear for swingingly supporting said body, said body consisting of a multiplicity of longitudinally extending independently movable segments adapted to be swung from one side of the body to the other for dumping predetermined fragmentary portions of the load at will, and spacer blocks carried by the normally top segments for preventing the upper edges of the said segments from engaging each other when one is swung over to the other side of the body.

In testimony whereof I affix my signature.

ROY R. BROWN.